(12) United States Patent
Kim (10) Patent No.: US 8,144,402 B2
(45) Date of Patent: Mar. 27, 2012

(54) ZOOM LENS AND IMAGING OPTICAL DEVICE INCLUDING THE SAME

(75) Inventor: Jin-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 12/731,946

(22) Filed: Mar. 25, 2010

(65) Prior Publication Data
US 2010/0277811 A1    Nov. 4, 2010

(30) Foreign Application Priority Data

Apr. 29, 2009    (KR) .................. 10-2009-0037822

(51) Int. Cl.
*G02B 15/14*    (2006.01)
(52) U.S. Cl. ....................... 359/687; 359/686
(58) Field of Classification Search .................. 359/686, 359/687
See application file for complete search history.

(56) References Cited

U.S. PATENT DOCUMENTS

| | | | | |
|---|---|---|---|---|
| 7,221,518 B2* | 5/2007 | Kim et al. | ..................... | 359/687 |
| 7,623,306 B2* | 11/2009 | Hankawa et al. | ............. | 359/781 |
| 2011/0058261 A1* | 3/2011 | Kakimoto | ..................... | 359/687 |

* cited by examiner

*Primary Examiner* — David N Spector
(74) *Attorney, Agent, or Firm* — Drinker Biddle & Reath LLP (57) ABSTRACT

A zoom lens for an imaging optical device that includes a first lens group having a positive refractive power; a second lens group having a negative refractive power; a third lens group having a positive refractive power; and a fourth lens group having a positive refractive power, arranged sequentially from an object side to an image side, and wherein each of the distances between the first lens group, the second lens group, the third lens group, and the fourth lens group varies during zooming, and wherein the first lens group comprises a doublet lens consisting of a negative lens and a positive lens, and the third lens group comprises a first positive lens, a second positive lens, a negative lens, and a third positive lens.

20 Claims, 3 Drawing Sheets

ZOOM LENS AND IMAGING OPTICAL DEVICE INCLUDING THE SAME

CROSS-REFERENCE TO RELATED PATENT APPLICATION

This application claims the benefit of Korean Patent Application No. 10-2009-0037822, filed on 29 Apr. 2009, in the Korean Intellectual Property Office, the disclosure of which is incorporated herein in its entirety by reference.

BACKGROUND OF THE INVENTION

1. Field of the Invention

The invention relates to a zoom lens having an ultra wide angle of view and large aperture, and an imaging optical device including the zoom lens.

2. Description of the Related Art

Video cameras or digital cameras including a solid-state imaging device, such as a charge-coupled device (CCD) or a complementary metal-oxide semiconductor (CMOS), have been widely used in recent years. In particular, the demand for megapixel camera modules is increasing, and high quality digital cameras with over 5 million pixels are now available. Digital cameras using an imaging device, such as a CCD or a CMOS, or imaging optical devices, such as mobile phone cameras, are required to be compact, light, and inexpensive, and are also required to have a wide angle of view in order to secure a sufficient visual field in a wide area.

For example, digital cameras, or optical systems using an interchangeable lens or a solid-state imaging device are required to have high resolution, a wide angle of view, and high magnification, and are also required to have a low F-number (FNO) in order to achieve high brightness. Some zoom lenses have a wide angle of view or high magnification, and other zoom lenses have a low FNO and high brightness and include an optical system with a fixed focal length. However, zoom lenses having a wide angle of view, high magnification, and a low FNO have not been developed yet due to technical difficulties.

While many 3-group zoom lenses have been developed to reduce the size of an optical system, it is still difficult for 3-group zoom lenses to have a wide angle of view and high magnification. Also, if zoom lenses having a low FNO are 3-group zoom lenses, a change in the FNO during zooming is great, and thus brightness often is high at a wide-angle position and is low at a telephoto position. It is also difficult for 4-group zoom lenses to have a wide angle of view, high magnification, high brightness, and compact design.

SUMMARY OF THE INVENTION

An embodiment of the invention provides a zoom lens having a wide angle of view, high magnification, and large aperture.

An embodiment of the invention also provides an imaging optical device including a zoom lens having a wide angle of view, high magnification, and large aperture.

According to an embodiment of the invention, there is provided a zoom lens including: a first lens group having a positive refractive power; a second lens group having a negative refractive power; a third lens group having a positive refractive power; and a fourth lens group having a positive refractive power, wherein the first lens group, the second lens group, the third lens group, and the fourth lens group are arranged sequentially from an object side to an image side, wherein each of the distances between the first lens group, the second lens group, the third lens group, and the fourth lens group varies during zooming, wherein the first lens group includes a doublet lens consisting of a negative lens and a positive lens, and the third lens group includes a first positive lens, a second positive lens, a negative lens, and a third positive lens, and satisfies $$1.4 \leq wfno \leq 2.5,$$

where wfno is a minimum F-number (FNO) at the wide-angle position.

According to another embodiment of the invention, there is provided a zoom lens including: a first lens group having a positive refractive power; a second lens group having a negative refractive power; a third lens group having a positive refractive power; and a fourth lens group having a positive refractive power, wherein the first lens group, the second lens group, the third lens group, and the fourth lens group are arranged sequentially from an object side to an image side, wherein the distances between the first lens group, the second lens group, the third lens group, and the fourth lens group vary during zooming, wherein the third lens group includes a first positive lens, a second positive lens, a negative lens, and a third positive lens, and satisfies $$0 \leq tfno - wfno \leq 1.3, \text{ and}$$

$$76° \leq wfov \leq 93°,$$

where wfno is a minimum FNO at the wide-angle position, tfno is a minimum FNO at the telephoto position, and wfov is the viewing angle at the wide-angle position.

At least one lens of the third lens group may satisfy $$70 \leq Vd3,$$

where Vd3 is the Abbe number of the at least one lens of the third lens group.

At least one lens of the first lens group may satisfy $$1.9 \leq Nd1,$$

where Nd1 is the refractive index of the at least one lens of the first lens group.

The second lens group may include a first negative lens, a second negative lens, and a positive lens.

The first positive lens of the second lens group may have an aspherical surface.

The zoom lens may further include an aperture stop disposed between the second lens group and the third lens group.

The stop may move along with the third lens group during zooming.

A lens of the third lens group, which is closest to the stop, may have an aspherical surface.

The third lens group may include at least one doublet lens consisting of a positive lens and a negative lens.

Vibration may be corrected by moving the third lens group in a direction perpendicular to an optical axis.

According to another embodiment of the invention, there is provided an imaging optical device including: a zoom lens; and an image sensor receiving light from an image formed by the zoom lens, wherein the zoom lens includes: a first lens group having a positive refractive power; a second lens group having a negative refractive power; a third lens group having a positive refractive power; and a fourth lens group having a positive refractive power, wherein the first lens group, the second lens group, the third lens group, and the fourth lens group are arranged sequentially from an object side to an image side, wherein the distances between the first lens group, the second lens group, the third lens group, and the fourth lens groups vary during zooming, wherein the first lens group includes a doublet lens including a negative lens and a positive lens, and the third lens group includes a first positive lens, a second positive lens, a negative lens, and a third positive lens, and satisfies $$1.4 \leq wfno \leq 2.5,$$

where wfno is a minimum FNO at the wide-angle position.

According to another embodiment of the invention, there is provided an imaging optical device including: a zoom lens; and an image sensor receiving light from an image formed by the zoom lens, wherein the zoom lens includes: a first lens group having a positive refractive power; a second lens group having a negative refractive power; a third lens group having a positive refractive power; and a fourth lens group having a positive refractive power, wherein the first lens group, the second lens group, the third lens group, and the fourth lens group are arranged sequentially from an object side to an image side, wherein the distances between the first lens group, the second lens group, the third lens group, and the fourth lens groups vary during zooming, wherein the third lens group includes a first positive lens, a second positive lens, a negative lens, and a third positive lens, and satisfies $$0 < tfno - wfno \leq 1.3, \text{ and}$$

$$76° \leq wfov \leq 93°,$$

where wfno is a minimum FNO at the wide-angle position, tfno is a minimum FNO at the telephoto position, and a wfov is the viewing angle at the wide-angle position.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE INVENTION

Various embodiments of the invention will now be described more fully in the following detailed description with reference to the accompanying drawings.

Figure 1:
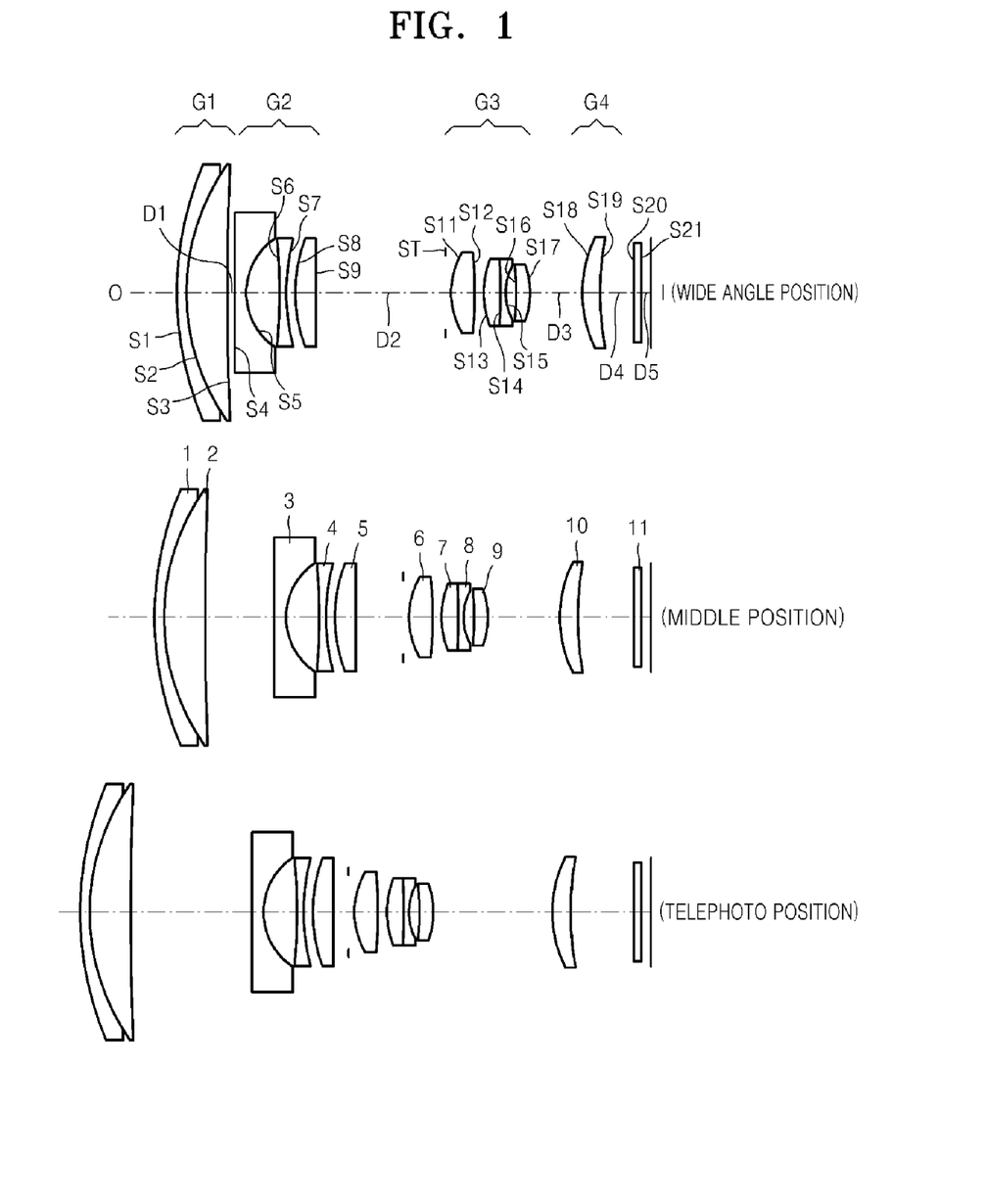
FIG. 1 illustrates optical arrangements of a zoom lens at the wide-angle position, the middle position, and the telephoto position, according to an embodiment of the invention.

FIG. 1 illustrates optical arrangements of a zoom lens at the wide-angle position, the middle position, and the telephoto position, according to an embodiment of the invention. Referring to FIG. 1, the zoom lens includes a first lens group G1 having a positive refractive power, a second lens group G2 having a negative refractive power, a third lens group G3 having a positive refractive power, and a fourth lens group G4 having a positive refractive power. The first lens group G1, the second lens group G2, the third lens group G3, and the fourth lens group G4 are arranged sequentially from an object side O to an image side I. The zoom lens is a 4-group zoom lens, and achieves high brightness both at the wide-angle position and the telephoto position by minimizing a change in an F-number (FNO) during zooming from the wide-angle position to the telephoto position.

During zooming from the wide-angle position to the telephoto position, all of the first lens group G1, the second lens group G2, the third lens group G3, and the fourth lens group G4 move, and the distances between the first lens group G1, the second lens group G2, the third lens group G3, and the fourth lens groups G4 vary.

The first lens group G1 may include a doublet lens comprising a negative lens 1 and a positive lens 2. The first lens group G1 may be one doublet lens.

In order to prevent resolution around an optical axis from being reduced even at a wide angle of view of more than 38 degrees, the second lens group G2 may include three lenses. For example, the second lens group G2 may include a first negative lens 3, a second negative lens 4, and a positive lens 5.

The third lens group G3 may include a first positive lens 6, a second positive lens 7, a negative lens 8, and a third positive lens 9 which are arranged sequentially from the object side O to the image side I. The third lens group G3 may include four lenses in order to have a low FNO, and is configured so as to easily control spherical aberration and chromatic aberration. The fourth lens group G4 may include a positive lens 10.

An aperture stop ST may be disposed between the second lens group G2 and the third lens group G3. The stop ST and the third lens group G3 may move together during zooming. Accordingly, the construction of the zoom lens may be simplified.

The zoom lens of FIG. 1 may satisfy Inequality 1 below.

$$1.4 \leq wfno \leq 2.5 \quad \text{(Inequality 1)},$$

where wfno is a minimum FNO at the wide-angle position. If the wfno satisfies Inequality 1, an image having high brightness and a low depth of field may be achieved at the wide-angle position. If the wfno is less than 1.4, manufacturing costs are increased considerably.

The zoom lens of FIG. 1 may satisfy Inequalities 2 and 3 below.

$$0 < tfno - wfno \leq 1.3 \quad \text{(Inequality 2)},$$

$$76° \leq wfov \leq 93° \quad \text{(Inequality 3)},$$

where wfno is the minimum FNO at the wide-angle position, tfno is the minimum FNO at the telephoto position, and wfov is the viewing angle at the wide-angle position. If the zoom lens satisfies Inequality 2, a change in the minimum FNO during zooming from the wide-angle position to the telephoto position may be minimized. Out-focusing for portrait photography may be achieved by reducing the FNO at the telephoto position.

The Abbe number of at least one lens of the third lens group G3 is defined by Inequality 4.

$$70 \leq Vd3 \quad \text{(Inequality 4)}$$

where Vd3 is the Abbe number of the at least one lens of the third lens group G3. Since the at least one lens of the third lens group G3 is formed of a material having an Abbe number of more than 70, chromatic aberration due to short-wavelength light may be easily controlled. Although chromatic aberration may be corrected by using a material having an Abbe number of less than 70, since a plurality of lenses are necessary in this case, it is difficult to make the zoom lens compact.

$$1.9 \leq Nd1 \quad \text{(Inequality 5)},$$

where Nd1 is the refractive index of at least one lens of the first lens group G1. For example, it is necessary to increase the refractive power of the negative lens 1 or the positive lens 2 of the first lens group G1 in order to achieve a wider angle of view. For example, the negative lens 1 of the first lens group G1 may be formed of a material having a refractive index of more than 1.9. Alternatively, both the negative lens 1 and the positive lens 2 may have a refractive index satisfying Inequality 5. If the at least one lens of the first lens group G1 does not satisfy Inequality 5, low marginal illumination and distortion may occur. Also, the radius of curvature of the at least one lens of the first lens group G1 may be reduced or the thickness of the at least one lens of the first lens group G1 may be increased, thereby making it difficult to manufacture the at least one lens of the first lens group G1.

The second lens group G2 may include at least one aspherical lens. For example, the first negative lens 3 of the second lens group G2 may have an aspherical surface. If the second negative lens 4 of the second lens group G2 has an aspherical surface, distortion and reduction in resolution at the wide-angle position may be corrected.

A lens of the third lens group G3, which is closest to the stop ST, may have an aspherical surface. For example, the first positive lens 6 of the third lens group G3 may have an aspherical surface, thereby making it easy to correct spherical aberration.

The third lens group G3 may include at least one doublet lens. For example, the second positive lens 7 and the negative lens 8 of the third lens group G3 may constitute a doublet lens. In FIG. 1, since the third lens group G3 includes four lenses respectively having positive, positive, negative, and positive refractive powers, aberration control is easy and chromatic aberration is corrected by using a doublet lens consisting of a positive lens and a negative lens.

The third lens group G3 moves in a direction perpendicular to the optical axis to correct or compensate for vibration. The third lens group G3 corrects spherical aberration and Petzval sum during a lens shift for vibration correction. Since the spherical aberration is corrected, eccentric coma occurring at the center of a screen when a vibration correction group, for example, moves in a direction perpendicular to the optical axis may be avoided. Also, since the Petzval sum is corrected, astigmatic field curvature occurring at the periphery of the screen when the third lens group G3 moves in the direction perpendicular to the optical axis for vibration correction may be avoided.

Figure 2A:
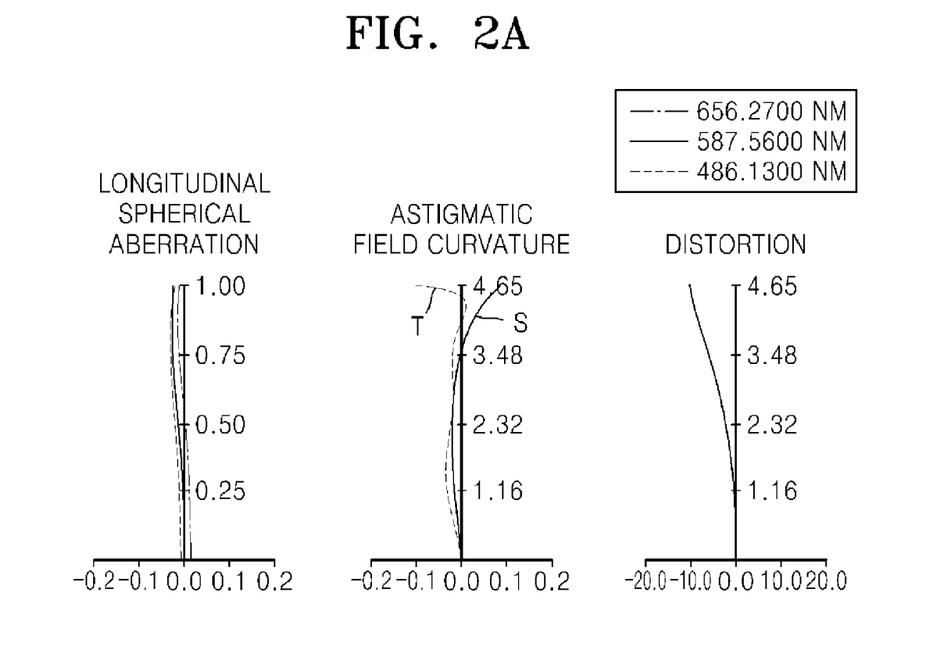
FIGS. 2A and 2B illustrate aberration at the wide-angle position and the telephoto position of the zoom lens of FIG. 1, respectively.
Figure 2B:
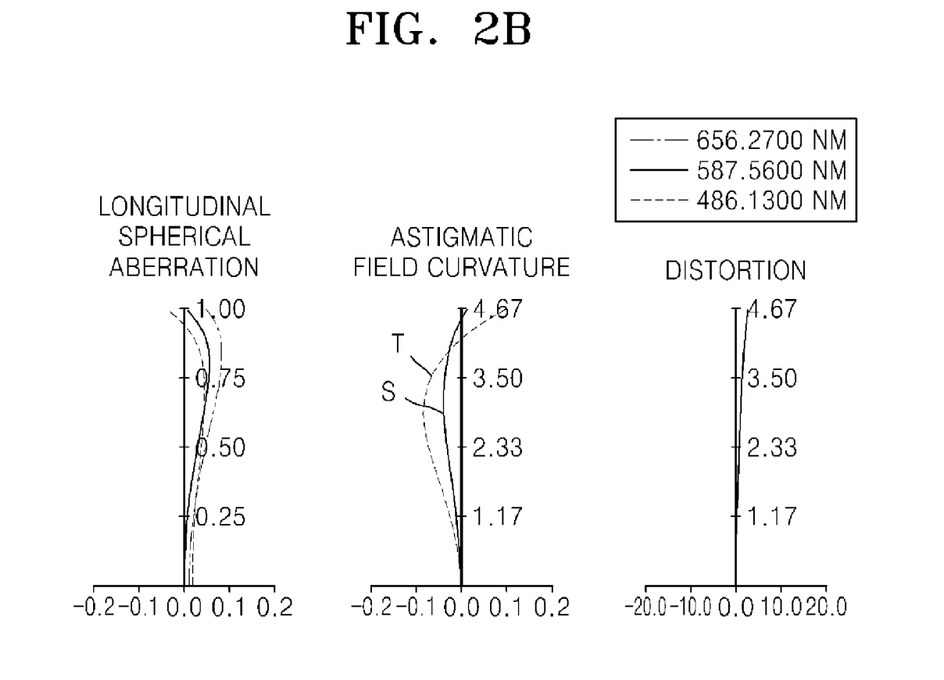

FIGS. 2A and 2B illustrate spherical aberration, astigmatic field curvature, and distortion at the wide-angle position and the telephoto position of the zoom lens of FIG. 1, respectively. A solid line represents spherical aberration for d-line, a dashed line represents spherical aberration for C-line, and a dash-dot line represents spherical aberration for g-line.

For the astigmatic field curvature, the vertical axis represents an image height, the horizontal axis represents a defocus value, the dotted line represents a tangential field curvature T, and the solid line represents a sagittal field curvature S.

Figure 3:
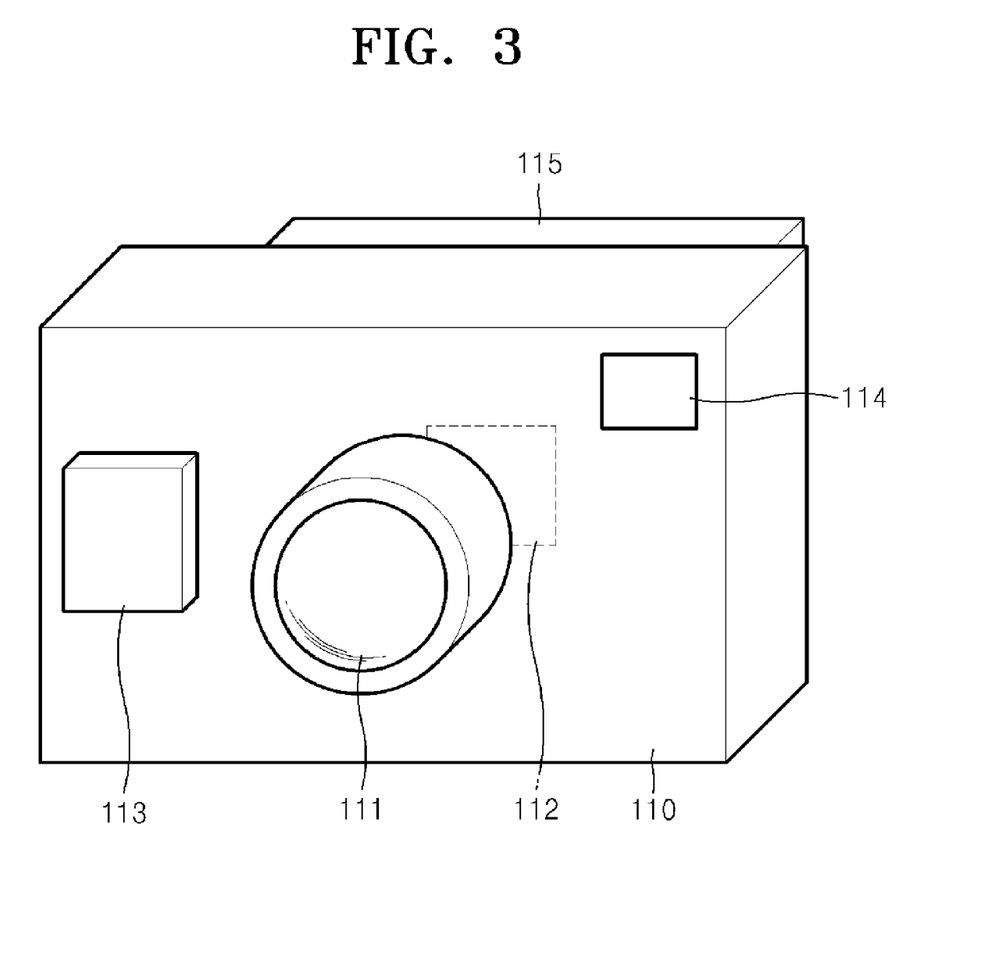
FIG. 3 is a perspective view of an imaging optical device according to an embodiment of the invention.

FIG. 3 is a perspective view of an imaging optical device including a zoom lens, according to an embodiment of the invention. The imaging optical device includes a zoom lens 111 and an image sensor 112 receiving light from an image formed by the zoom lens 111. The imaging optical device further includes a recording unit 113 recording information about an image of a subject, which is photoelectrically converted by the image sensor 112, and a finder 114 used to observe the subject. The imaging optical device may include a liquid crystal display panel 115 displaying the image of the subject. The imaging optical device of FIG. 3 is exemplary and the invention is not limited thereto, and may be used in various optical equipment other than a camera. If the zoom lens according to the invention is applied to an imaging optical device such as a digital camera, optical equipment having a compact design, high magnification, high brightness, and a wide angle of view may be realized.

An aspherical surface used in the zoom lens of FIG. 1 may be defined by Formula 6 below.

$$Z = \frac{Cy^2}{1+\sqrt{1-(K+1)C^2y^2}} + A_4 y^4 + A_6 y^6 + A_8 y^8 + A_{10} y^{10}, \quad \text{(Formula 6)}$$

where y is height in the direction perpendicular to the optical axis, Z is a sag amount along the optical axis at the height h, C is a reciprocal of the radius of curvature, K is a conic constant, and Ai is an $i^{th}$-order aspherical coefficient.

Various embodiments of the invention will now be explained.

A straight line on the right side in each drawing represents the position of an image plane IM, and a cover glass 11 of an image sensor or an infrared (IR) cutoff filter may be disposed on the object side O. Lens data of a zoom lens in each embodiment, that is, aspherical data, a focal length EFL, an FNO, a viewing angle ω, variable distances D1, D2, D3, D4, and D5 between lenses, a radius of curvature R, a distance or thickness D between the lenses, a refractive index Nd, and an Abbe number ($V_d$), is shown as follows. The Abbe number vd for d-line of a wavelength of 587.6 nm, and the stop ST denotes a light amount adjusting unit. The symbol * appearing to the side of a lens surface number denotes an aspherical surface.

Embodiment 1

The value for Inequality 1 is 2.06, the value for Inequality 2 is 0.86, the value for Inequality 3 is 87.92, the value for Inequality 4 is 81.60, and the value for Inequality 5 is 1.92. EFL: 5.36 mm~17.90 mm, FNO: 2.06~2.92, viewing angle ω: 87.92°~28.51°

| Lens surface | Radius of curvature | Thickness | Refractive index (nd) | Abbe number ($V_d$) |
|---|---|---|---|---|
| S1 | 31.826 | 0.90 | 1.923 | 20.88 |
| S2 | 21.293 | 3.90 | 1.883 | 40.81 |
| S3 | 250.387 | D1 | | |
| S4* | 150.000 | 1.10 | 1.882 | 32.71 |
| S5* | 5.554 | 3.20 | | |
| S6 | −61.607 | 0.60 | 1.883 | 40.81 |
| S7 | 17.797 | 0.89 | | |
| S8 | 15.172 | 1.96 | 1.924 | 20.64 |
| S9 | 1151.390 | D2 | | |
| ST | infinity | 0.50 | | |
| S11* | 7.663 | 2.25 | 1.747 | 48.48 |
| S12* | −26.305 | 0.88 | | |
| S13 | 9.730 | 1.58 | 1.500 | 78.49 |
| S14 | −86.311 | 0.50 | 1.846 | 23.78 |
| S15 | 5.542 | 1.02 | | |
| S16 | −19.732 | 1.29 | 1.496 | 81.60 |
| S17 | −8.200 | D3 | | |
| S18 | 11.629 | 1.79 | 1.815 | 44.40 |
| S19 | 30.000 | D4 | | |
| S20 | infinity | 0.80 | 1.517 | 64.17 |
| S21 | infinity | D5 | | |

| Variable distance | Wide-angle position | Middle position | Telephoto position |
|---|---|---|---|
| D1 | 0.70 | 6.66 | 11.59 |
| D2 | 12.39 | 4.56 | 1.50 |
| D3 | 5.00 | 6.88 | 11.32 |
| D4 | 3.10 | 5.34 | 5.88 |
| D5 | 0.90 | 0.90 | 0.90 |

<Aspherical Coefficient>

| Lens surface | K | A | B | C | D |
|---|---|---|---|---|---|
| S4 | −1.000000 | −7.137872E−05 | −5.370422E−07 | 1.996569E−08 | −1.057208E−10 |
| S5 | −0.203512 | −2.915480E−04 | 3.088538E−06 | −6.772297E−07 | 6.212649E−09 |
| S11 | −0.156625 | −1.996286E−04 | 3.160580E−07 | 1.035007E−09 | 0.000000E+00 |
| S12 | 4.858611 | 2.741064E−04 | 3.060116E−07 | 0.000000E+00 | 0.000000E+00 |

Embodiment 2

The value for Inequality 1 is 1.43, the value for Inequality 2 is 0.34, the value for Inequality 3 is 78.72, the value for Inequality 4 is 81.60, and the value for Inequality 5 is 1.92. EFL: 6.30 mm~18.27 mm, FNO: 1.43~1.77, viewing angle ω: 78.72°~28.28°

| Lens surface | Radius of curvature | Thickness | Refractive index (nd) | Abbe number ($V_d$) |
|---|---|---|---|---|
| S1 | 30.233 | 0.95 | 1.923 | 20.88 |
| S2 | 19.386 | 4.97 | 1.883 | 40.8 |
| S3 | 247.208 | D1 | | |
| S4* | 370.240 | 0.95 | 1.851 | 40.43 |
| S5* | 7.463 | 3.92 | | |
| S6 | −22.883 | 0.65 | 1.572 | 40.03 |
| S7 | 33.071 | 0.10 | | |
| S8 | 19.835 | 1.94 | 1.946 | 17.98 |
| S9 | 483.047 | D2 | | |
| ST | infinity | 0.65 | | |
| S11* | 10.452 | 3.44 | 1.752 | 36.65 |
| S12 | 318.271 | 0.79 | | |
| S13 | 10.414 | 2.29 | 1.773 | 49.62 |
| S14 | −71.374 | 0.65 | 1.772 | 21.61 |
| S15 | 6.120 | 1.79 | | |
| S16 | 9.685 | 1.53 | 1.497 | 81.61 |
| S17 | 29.635 | D3 | | |
| S18* | 9.187 | 2.04 | 1.773 | 49.62 |
| S19 | 27.404 | D4 | | |
| S20 | infinity | 0.30 | 1.517 | 64.17 |
| S21 | infinity | 0.30 | | |
| S22 | infinity | 0.50 | 1.517 | 64.17 |
| S23 | infinity | D5 | | |

| Variable length | Wide-angle position | Middle position | Telephoto position |
|---|---|---|---|
| D1 | 0.85 | 5.16 | 10.54 |
| D2 | 14.32 | 4.58 | 1.28 |
| D3 | 3.87 | 5.95 | 8.15 |
| D4 | 3.95 | 5.83 | 6.23 |
| D5 | 0.60 | 0.60 | 0.60 |

<Aspherical Coefficient>

| Lens surface | K | A | B | C | D |
|---|---|---|---|---|---|
| S4 | 0.000000 | −4.639277E−05 | 1.425866E−06 | −1.559706E−08 | 5.668515E−11 |
| S5 | −0.529453 | 2.492264E−05 | 3.831471E−07 | 1.096303E−07 | −1.430160E−09 |
| S11 | 0.000000 | −9.410968E−05 | −4.444297E−07 | 2.958636E−09 | −1.488402E−10 |
| S18 | −2.390584 | 2.183742E−04 | 6.287134E−08 | 0.000000E+00 | 0.000000E+00 |

Embodiment 3

The value for Inequality 1 is 2.45, the value for Inequality 2 is 1.06, the value for Inequality 3 is 92.84, the value for Inequality 4 is 82.88, and the value for Inequality 5 is 1.95. EFL: 5.00 mm~19.75 mm, FNO: 2.45~3.51, viewing angle ω: 92.84°~25.98°

| Lens surface | Radius of curvature | Thickness | Refractive index (nd) | Abbe number ($V_d$) |
|---|---|---|---|---|
| S1 | 21.461 | 0.90 | 1.946 | 17.98 |
| S2 | 17.033 | 4.75 | 1.773 | 49.62 |
| S3 | 63.711 | D1 | | |
| S4 | 37.767 | 1.10 | 1.882 | 32.71 |
| S5* | 5.210 | 3.70 | | |
| S6 | −35.112 | 0.60 | 1.758 | 50.31 |
| S7 | 13.646 | 0.10 | | |
| S8 | 10.915 | 2.00 | 1.950 | 18.45 |
| S9 | 104.342 | D2 | | |
| ST | infinity | 0.50 | | |
| S11* | 9.342 | 1.65 | 1.773 | 49.62 |
| S12 | −36.761 | 0.60 | | |
| S13 | 12.462 | 2.84 | 1.490 | 82.88 |
| S14 | −55.637 | 0.50 | 1.874 | 21.21 |
| S15 | 7.360 | 0.72 | | |
| S16 | −346.882 | 1.39 | 1.708 | 53.06 |
| S17 | −10.347 | D3 | | |
| S18 | 10.651 | 1.65 | 1.724 | 52.06 |
| S19 | 26.282 | D4 | | |
| S20 | infinity | 0.30 | 1.517 | 64.17 |
| S21 | infinity | 0.30 | | |
| S22 | infinity | 0.50 | 1.517 | 64.17 |
| S23 | infinity | D5 | | |

| Variable distance | Wide-angle position | Middle position | Telephoto position |
|---|---|---|---|
| D1 | 0.70 | 8.60 | 15.01 |
| D2 | 10.53 | 3.01 | 1.50 |
| D3 | 2.00 | 4.21 | 10.03 |
| D4 | 4.50 | 6.29 | 4.29 |
| D5 | 0.60 | 0.60 | 0.60 |
| D6 | −0.02 | −0.02 | −0.03 |

<Aspherical Coefficient>

| Lens surface | K | A | B | C | D |
|---|---|---|---|---|---|
| S5 | −0.171749 | 9.092379E−06 | −5.637770E−07 | 1.572577E−07 | −5.682925E−09 |
| S11 | −0.351755 | −2.283981E−04 | 3.420203E−07 | −3.942092E−08 | 0.000000E+00 |

Embodiment 4

The value for Inequality 1 is 2.11, the value for Inequality 2 is 0.77, the value for Inequality 3 is 84.45, the value for Inequality 4 is 70.40, and the value for Inequality 5 is 1.92. EFL: 5.35 mm~15.74 mm, FNO: 2.11~2.88, viewing angle ω: 84.45°~32.46°

| Lens surface | Radius of curvature | Thickness | Refractive index (nd) | Abbe number ($V_d$) |
|---|---|---|---|---|
| S1 | 47.240 | 0.97 | 1.923 | 20.88 |
| S2 | 30.453 | 3.79 | 1.883 | 40.81 |
| S3 | 347.178 | D1 | | |
| S4* | 55.043 | 0.97 | 1.851 | 40.43 |
| S5* | 6.897 | 4.56 | | |
| S6 | −35.659 | 0.61 | 1.883 | 40.81 |
| S7 | 42.486 | 0.73 | | |
| S8 | 20.914 | 2.81 | 1.901 | 20.06 |
| S9 | −172.453 | D2 | | |
| ST | infinity | 0.36 | | |
| S11* | 7.946 | 2.98 | 1.623 | 46.16 |
| S12* | −28.858 | 0.73 | | |
| S13 | 14.843 | 2.03 | 1.809 | 42.84 |
| S14 | −18.380 | 0.61 | 1.799 | 23.59 |
| S15 | 6.249 | 1.41 | | |
| S16 | −18.418 | 1.48 | 1.487 | 70.44 |
| S17 | −7.831 | D3 | | |
| S18* | 12.434 | 2.31 | 1.777 | 45.44 |
| S19* | 21.751 | D4 | | |
| S20 | infinity | 0.80 | 1.517 | 64.17 |
| S21 | infinity | D5 | | |

| Variable distance | Wide-angle position | Middle position | Telephoto position |
|---|---|---|---|
| D1 | 0.85 | 9.03 | 14.44 |
| D2 | 15.48 | 3.98 | 0.99 |
| D3 | 3.43 | 6.57 | 8.96 |
| D4 | 3.81 | 4.96 | 5.13 |
| D5 | 0.60 | 0.60 | 0.60 |

<Aspherical Coefficient>

| Lens surface | K | A | B | C | D |
|---|---|---|---|---|---|
| S4 | 0.000000 | 6.095340E−05 | −1.182492E−06 | 4.340285E−09 | 9.944629E−12 |
| S5 | −0.119625 | 8.572469E−06 | −1.198861E−06 | 1.440375E−08 | −2.547827E−09 |
| S11 | 0.000000 | −1.374691E−04 | 6.543903E−06 | −2.467478E−07 | 1.663665E−08 |
| S12 | −48.888838 | 1.421439E−04 | 1.505551E−05 | −5.031188E−07 | 2.880309E−08 |
| S18 | 0.264395 | −2.091476E−04 | −2.009821E−06 | 2.653539E−07 | −4.650477E−09 |
| S19 | 0.000000 | −2.616927E−04 | −5.735477E−06 | 5.220127E−07 | −9.416001E−09 |

Embodiment 5

The value for Inequality 1 is 1.84, the value for Inequality 2 is 0.49, the value for Inequality 3 is 88.88, the value for Inequality 4 is 81.60, and the value for Inequality 5 is 1.92. EFL: 5.37 mm~15.29 mm, FNO: 1.84~2.33, viewing angle ω: 88.88°~33.04°

| Lens surface | Radius of curvature | Thickness | Refractive index (nd) | Abbe number ($V_d$) |
|---|---|---|---|---|
| S1 | 33.910 | 0.90 | 1.923 | 20.88 |
| S2 | 21.005 | 3.95 | 1.883 | 40.8 |
| S3 | 234.155 | D1 | | |
| S4* | 92.138 | 1.10 | 1.805 | 40.9 |
| S5* | 5.748 | 3.42 | | |
| S6 | −33.264 | 0.60 | 1.883 | 40.8 |
| S7 | 33.053 | 0.57 | | |
| S8 | 16.684 | 1.85 | 1.923 | 20.88 |
| S9 | −428.918 | D2 | | |
| ST | infinity | 0.50 | | |
| S11* | 8.893 | 2.28 | 1.740 | 49.00 |
| S12* | −22.488 | 1.49 | | |
| S13 | 11.962 | 1.66 | 1.606 | 56.77 |
| S14 | −16.403 | 0.50 | 1.847 | 23.78 |

-continued

| Lens surface | Radius of curvature | Thickness | Refractive index (nd) | Abbe number ($V_d$) |
|---|---|---|---|---|
| S15 | 7.229 | 1.12 | | |
| S16 | −10.402 | 1.98 | 1.497 | 81.60 |
| S17* | −6.299 | D3 | | |
| S18 | 9.264 | 1.57 | 1.804 | 46.50 |
| S19 | 15.873 | D4 | | |
| S20 | infinity | 0.30 | 1.517 | 64.17 |
| S21 | infinity | 0.30 | | |
| S22 | infinity | 0.50 | 1.517 | 64.17 |
| S23 | infinity | D5 | | |

| Variable distance | Wide-angle position | Middle position | Telephoto position |
|---|---|---|---|
| D1 | 0.70 | 5.08 | 12.22 |
| D2 | 12.77 | 4.69 | 1.50 |
| D3 | 3.75 | 4.64 | 6.92 |
| D4 | 3.09 | 5.04 | 5.41 |
| D5 | 0.60 | 0.60 | 0.60 |

<Aspherical Coefficient>

| Lens surface | K | A | B | C | D |
|---|---|---|---|---|---|
| S4 | 0.000000 | −7.045446E−05 | 2.546855E−07 | 0.000000E+00 | 0.000000E+00 |
| S5 | −0.636707 | 1.396641E−04 | 2.636977E−06 | −7.499631E−08 | 9.761142E−10 |
| S11 | 0.130332 | −1.606953E−04 | 1.573058E−06 | −1.288846E−08 | 0.000000E+00 |
| S12 | 4.941288 | 2.999418E−04 | 1.312158E−06 | 0.000000E+00 | 0.000000E+00 |
| S17 | −0.888147 | −9.153818E−05 | 5.359445E−06 | 0.000000E+00 | 0.000000E+00 |

The above embodiments satisfy Inequalities 1 through 5, and their corresponding values are shown as follows.

|  | Conditions | Embodiment 1 | Embodiment 2 | Embodiment 3 | Embodiment 4 | Embodiment 5 |
| --- | --- | --- | --- | --- | --- | --- |
| Inequality 1 | $1.4 \leq wfno \leq 2.5$ | 2.06 | 1.43 | 2.45 | 2.11 | 1.84 |
| Inequality 2 | $0 < tfno-wfno \leq 1.3$ | 0.86 | 0.34 | 1.06 | 0.77 | 0.49 |
| Inequality 3 | $76° \leq wfov \leq 93°$ | 87.92 | 78.72 | 92.84 | 84.45 | 88.88 |
| Inequality 4 | $70 \leq Vd3$ | 81.60 | 81.60 | 82.88 | 70.40 | 81.60 |
| Inequality 5 | $1.9 \leq Nd1$ | 1.92 | 1.92 | 1.95 | 1.92 | 1.92 |

The zoom lens according to an embodiment of the invention has an ultra wide angle of view, high magnification, and large aperture. For example, the zoom lens may have an angle of view of more than 76 degrees, a magnification of more than 3×, and an FNO of less than 2.5. The zoom lens may have a simple configuration, may be made compact, and may be manufactured at low cost. The zoom lens may secure a sufficient visual field in a wide area. The zoom lens according to the invention may be applied to an imaging optical device, such as a digital still camera using a solid-state imaging device, a video camera, or a mobile terminal.

While the invention has been particularly shown and described with reference to exemplary embodiments thereof, it will be understood by one of ordinary skill in the art that various changes in form and details may be made therein without departing from the spirit and scope of the invention as defined by the following claims.

What is claimed is:

1. A zoom lens comprising:
   a first lens group having a positive refractive power;
   a second lens group having a negative refractive power;
   a third lens group having a positive refractive power; and
   a fourth lens group having a positive refractive power,
      wherein the first lens group, the second lens group, the third lens group, and the fourth lens group are arranged sequentially from an object side to an image side,
   wherein each of the distances between the first lens group, the second lens group, the third lens group, and the fourth lens group varies during zooming,
   wherein the first lens group comprises a doublet lens comprising a negative lens and a positive lens, and the third lens group comprises a first positive lens, a second positive lens, a negative lens, and a third positive lens, and satisfies $$1.4 \leq wfno \leq 2.5,$$

where wfno is a minimum F-number (FNO) at the wide-angle position.

2. The zoom lens of claim 1, wherein at least one lens of the third lens group satisfies $$70 \leq Vd3,$$

where Vd3 is the Abbe number of the at least one lens of the third lens group.

3. The zoom lens of claim 1, wherein at least one lens of the first lens group satisfies $$1.9 \leq Nd1,$$

where Nd1 is the refractive index of the at least one lens of the first lens group.

4. The zoom lens of claim 1, wherein the third lens group comprises at least one doublet lens comprising a positive lens and a negative lens.

5. The zoom lens of claim 1, wherein vibration is corrected by moving the third lens group in a direction perpendicular to an optical axis.

6. The zoom lens of claim 1, wherein the second lens group comprises a first negative lens, a second negative lens, and a positive lens.

7. The zoom lens of claim 6, wherein the first negative lens of the second lens group has an aspherical surface.

8. The zoom lens of claim 1, further comprising an aperture stop disposed between the second lens group and the third lens group.

9. The zoom lens of claim 8, wherein the stop moves along with the third lens group during zooming.

10. The zoom lens of claim 8, wherein a lens of the third lens group, which is closest to the stop, has an aspherical surface.

11. A zoom lens comprising:
    a first lens group having a positive refractive power;
    a second lens group having a negative refractive power;
    a third lens group having a positive refractive power; and
    a fourth lens group having a positive refractive power,
       wherein the first lens group, the second lens group, the third lens group, and the fourth lens group are arranged sequentially from an object side to an image side,
    wherein the distance between the first lens group, the second lens group, the third lens group, and the fourth lens group varies during zooming,
    wherein the third lens group comprises a first positive lens, a second positive lens, a negative lens, and a third positive lens, and satisfies $$0 < tfno-wfno \leq 1.3, \text{ and}$$

$$76° \leq wfov \leq 93°,$$

where wfno is a minimum FNO at the wide-angle position, tfno is a minimum FNO at the telephoto position, and wfov is a viewing angle at the wide-angle position.

12. The zoom lens of claim 11, wherein at least one lens of the third lens group satisfies $$70 \leq Vd3,$$

where Vd3 is the Abbe number of the at least one lens of the third lens group.

13. The zoom lens of claim 11, wherein at least one lens of the first lens group satisfies $$1.9 \leq Nd1,$$

where Nd1 is the refractive index of the at least one lens of the first lens group.

14. The zoom lens of claim 11, further comprising an aperture stop disposed between the second lens group and the third lens group.

15. The zoom lens of claim 11, wherein the second lens group comprises a first negative lens, a second negative lens, and a positive lens.

16. The zoom lens of claim 15, wherein the first positive lens of the second lens group has an aspherical surface.

17. An imaging optical device comprising:
a zoom lens; and
an image sensor receiving light from an image formed by the zoom lens,
wherein the zoom lens comprises:
a first lens group having a positive refractive power;
a second lens group having a negative refractive power;
a third lens group having a positive refractive power; and
a fourth lens group having a positive refractive power,
wherein the first lens group, the second lens group, the third lens group, and the fourth lens group are arranged sequentially from an object side to an image side,
wherein the distance between the first lens group, the second lens group, the third lens group, and the fourth lens group varies during zooming,
wherein the first lens group comprises a doublet lens comprising a negative lens and a positive lens, and the third lens group comprises a first positive lens, a second positive lens, a negative lens, and a third positive lens, and satisfies $$1.4 \leq wfno \leq 2.5,$$

where wfno is a minimum FNO at the wide-angle position.

18. The imaging optical device of claim 17, wherein at least one lens of the third lens group satisfies $$70 \leq Vd3$$

where Vd3 is the Abbe number of the at least one lens of the third lens group.

19. The imaging optical device of claim 17, wherein at least one lens of the first lens group satisfies $$1.9 \leq Nd1$$

where Nd1 is the refractive index of the at least one lens of the first lens group.

20. An imaging optical device comprising:
a zoom lens; and
an image sensor receiving light from an image formed by the zoom lens,
wherein the zoom lens comprises:
a first lens group having a positive refractive power;
a second lens group having a negative refractive power;
a third lens group having a positive refractive power; and
a fourth lens group having a positive refractive power,
wherein the first lens group, the second lens group, the third lens group, and the fourth lens group are arranged sequentially from an object side to an image side,
wherein the distance between the first lens group, the second lens group, the third lens group, and the fourth lens group varies during zooming,
wherein the third lens group comprises a first positive lens, a second positive lens, a negative lens, and a third positive lens, and satisfies $$0 < tfno - wfno \leq 1.3, \text{ and}$$

$$76° \leq wfov \leq 93°,$$

where wfno is a minimum FNO at the wide-angle position, tfno is a minimum FNO at the telephoto position, and a wfov is a viewing angle at the wide-angle position.

* * * * *